(12) United States Patent
Smith

(10) Patent No.: US 7,043,926 B2
(45) Date of Patent: May 16, 2006

(54) CARGO AREA GROCERY CHILLER

(75) Inventor: Mark Smith, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 10/803,433

(22) Filed: Mar. 18, 2004

(65) Prior Publication Data

US 2005/0204763 A1    Sep. 22, 2005

(51) Int. Cl.
*B60H 1/32*    (2006.01)
(52) U.S. Cl. .............. 62/89; 62/199; 62/244
(58) Field of Classification Search ............ 62/186, 62/199, 200, 244, 89
See application file for complete search history.

(56) References Cited

U.S. PATENT DOCUMENTS

| | | | | |
|---|---|---|---|---|
| 3,850,006 A * | 11/1974 | Redfern et al. | ............ | 62/216 |
| 4,364,444 A | 12/1982 | Donato et al. | ............ | 180/65 R |
| 4,483,151 A * | 11/1984 | Fujioka et al. | ............ | 62/157 |
| 4,622,828 A * | 11/1986 | Fujiwara et al. | ............ | 62/200 |
| 4,637,220 A * | 1/1987 | Sakano | ............ | 62/200 |
| 4,936,103 A | 6/1990 | Newman | ............ | 62/89 |
| 4,959,974 A * | 10/1990 | Kusakabe | ............ | 62/228.5 |
| 5,203,833 A | 4/1993 | Howell | ............ | 165/41 |
| 5,839,293 A | 11/1998 | Teitelbaum et al. | ............ | 62/244 |
| 5,979,167 A * | 11/1999 | Kochavi et al. | ............ | 62/186 |
| 6,152,217 A * | 11/2000 | Ito et al. | ............ | 165/202 |
| 6,266,967 B1 * | 7/2001 | Honda | ............ | 62/193 |
| 6,422,027 B1 | 7/2002 | Coates, Jr. et al. | ............ | 62/259.2 |
| 6,502,656 B1 | 1/2003 | Weiss et al. | ............ | 180/168 |
| 6,804,973 B1 * | 10/2004 | Sugiura | ............ | 62/244 |

* cited by examiner

*Primary Examiner*—William E. Tapolcai
(74) *Attorney, Agent, or Firm*—Gigette M. Bejin

(57) ABSTRACT

Method and apparatus for supplying refrigerated air to a localized volume in a vehicle, suitable for the transport of groceries and other perishables. The localized volume is created by insulated panels in the storage area of a vehicle. The chiller unit includes an air duct that contains inlet and outlet openings, an evaporator core and a fan. The evaporator core receives refrigerant fluid from a powered compressor and a condenser that are shared in common with the HVAC system that serves the passenger compartment. Although the compressor and condenser are shared, the chiller unit is separate and may be used independently of the HVAC system.

23 Claims, 4 Drawing Sheets

CARGO AREA GROCERY CHILLER

BACKGROUND OF THE INVENTION

The invention relates generally to the field of vehicle cooling systems and more specifically to method and apparatus for providing cooling to a localized volume within a vehicle.

Currently in motor vehicles, heating, ventilating, and air conditioning (HVAC) systems provide a controlled environment for the passenger compartment. Such systems are well known to be either manually or automatically controlled to maintain an environment within a temperature range that is selectable by a driver or passenger occupant, as desired.

It is also well known that when a vehicle is exposed to sun-loads or high ambient temperatures for a prolonged period of time, both the passenger compartment and the cargo storage area become excessively hot. While most HVAC systems can provide rapid cool-down of the passenger compartment to a temperature that is comfortable for the human occupants, the cooling of the cargo storage area lags or doesn't happen. In any event, without separate cooling, the transporting of groceries or other perishables in the storage compartment requires the use of insulated containers or short trips to prevent spoilage or melting.

Several attempts have been made to modify vehicles and their HVAC systems to provide heated or cooled air to cargo storage areas in order to maintain such areas at desired temperatures.

U.S. Pat. No. 5,839,293 shows a ducting system which directs air from the vehicle HVAC system, intended for heating, ventilating and cooling the passenger compartment to the cargo area of the vehicle. A valve is shown which allows heated or cooled air from the HVAC to be directed to either the passenger compartment or to the cargo area, as desired.

U.S. Pat. No. 5,203,833 shows a food storage container with air ducts that are connected into the conduit which carries conditioned air for the passenger compartment. The ducts of the food storage container divert conditioned air to the container, allowing the air to pass through the container and return to the conduit. The interior of the food storage container appears to be maintained at the same temperature as the conditioned air supplied to the passenger compartment.

U.S. Pat. No. 4,936,103 shows an insulated food container in the storage compartment of a vehicle and an air conduit extending between an air vent on the dash of the vehicle and the container. Heated or cooled air from the HVAC system is forced directly into the food container. An auxiliary fan can be mounted within the air conduit to increase the flow of air to the food container.

Commonly assigned U.S. Ser. No. 10/605,181 filed Sep. 12, 2003 discloses a system for controlling the fluid flow to a plurality of heat exchangers.

Commonly assigned U.S. Ser. No. 10/605,179 filed Sep. 12, 2003 discloses a system for cooling a vehicle battery such as that used to power an electric vehicle.

Applicant has recognized that it would be desirable to provide a system which allows for environmental cooling of the cargo area separate from and without adversely affecting the heating, cooling, or ventilating that occurs in the passenger compartment of a vehicle.

SUMMARY OF THE INVENTION

The present invention includes apparatus and method for providing controlled cooling to the air in a localized volume suitable for storing groceries and the like. In a passenger vehicle which contains an HVAC system for controlling the interior temperature of the passenger compartment, the invention comprises walls, flooring and cover to define the localized volume and insulation to retard the migration of heat to the localized volume. An air duct is provided with openings in communication with the localized volume to receive air returned from the localized volume and to direct the flow of air supplied to the localized volume. An evaporator core/heat exchanger is located within the air duct and is connected to receive refrigerant fluid from a condenser shared in common with the HVAC system and to cool air flowing in the air duct. An air movement device for creating a flow of air through the air duct also is located within the air duct. A sensor is located within the air duct for sensing the temperature of air flowing through the air duct. A control device is connected to the sensor and to the air movement device for regulating the flow of air over the evaporator core and into the localized volume as necessary to cool and maintain the temperature of the localized volume within a predetermined range of temperatures. The range may be either preset or manually adjustable at the chiller or remotely, depending on the desired installation.

It is an object of the present invention to provide a cooled space within an automotive vehicle that is suitable for transporting groceries and other perishables.

It is another object of the present invention to provide a cooling apparatus that will recirculate and cool the air within a localized volume such as the cargo space of a passenger vehicle.

It is a further object of the present invention to provide a cooling apparatus that will cool a localized volume within a vehicle independent of the heating, cooling or ventilating that takes place in the passenger compartment of a vehicle.

DETAILED DESCRIPTION OF THE INVENTION

Figure 1:
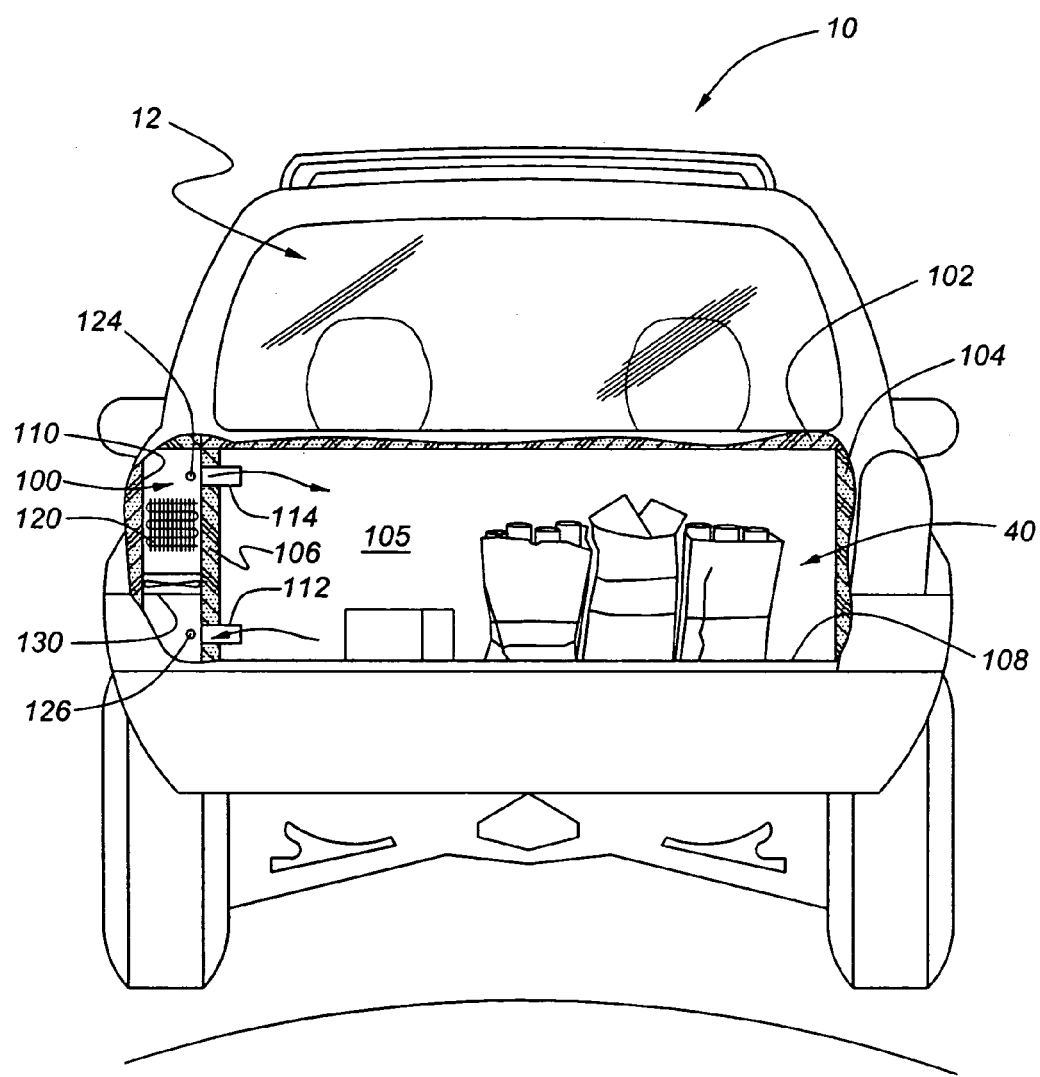
FIG. 1 is a cut-away rear view of a vehicle containing the preferred embodiment of the present invention.

In FIG. 1, a cut-away rear view of a vehicle 10 is shown to contain the present invention. The vehicle is represented by a passenger compartment 12 and a rear cargo storage area 40. In order to define a localized volume for transporting and cooling groceries or other perishables, insulated wall panels 104, 105, and 106 are shown. Another insulated wall panel contained on the rear door or lift gate (not shown) completes the lateral definition of the volume. The floor 108 already contains insulation for the purpose of noise suppression, but more may be added if necessary. An insulated cover 102 may be a hinged panel or a roll up shade type to provide vertical access to the space.

The grocery chiller unit 100 is shown contained within the vehicle 10 adjacent to wall panel 106. The chiller unit 100 includes an air duct 110 with a pair of openings 112 and 114 to remove and supply air to the localized volume 40. An evaporator core 120 is also contained within air duct 110 to refrigerate the air flowing therethrough. A variable speed fan or blower 130 also is included within the air duct 110 to act as an air movement device. The fan 130 forces the air through the duct 110 and the evaporator core 120 as well as providing the supply and removal of cooled air to and from the localized volume. Temperature sensors 124 and 126 are provided next to the respective duct openings 114 and 112.

Although not shown, it is conceived that as an alternative to an roll-up or hinged cover 102, one could attach a light weight heat reflecting and/or or insulating blanket to wall 106 above the duct opening 114 to contain the air flow beneath the blanket. Alternatively, one could also make wall 104 movable in order to reduce the size of the localized volume 40 as desired to improve the efficiency of the chiller unit 100.

Figure 2:
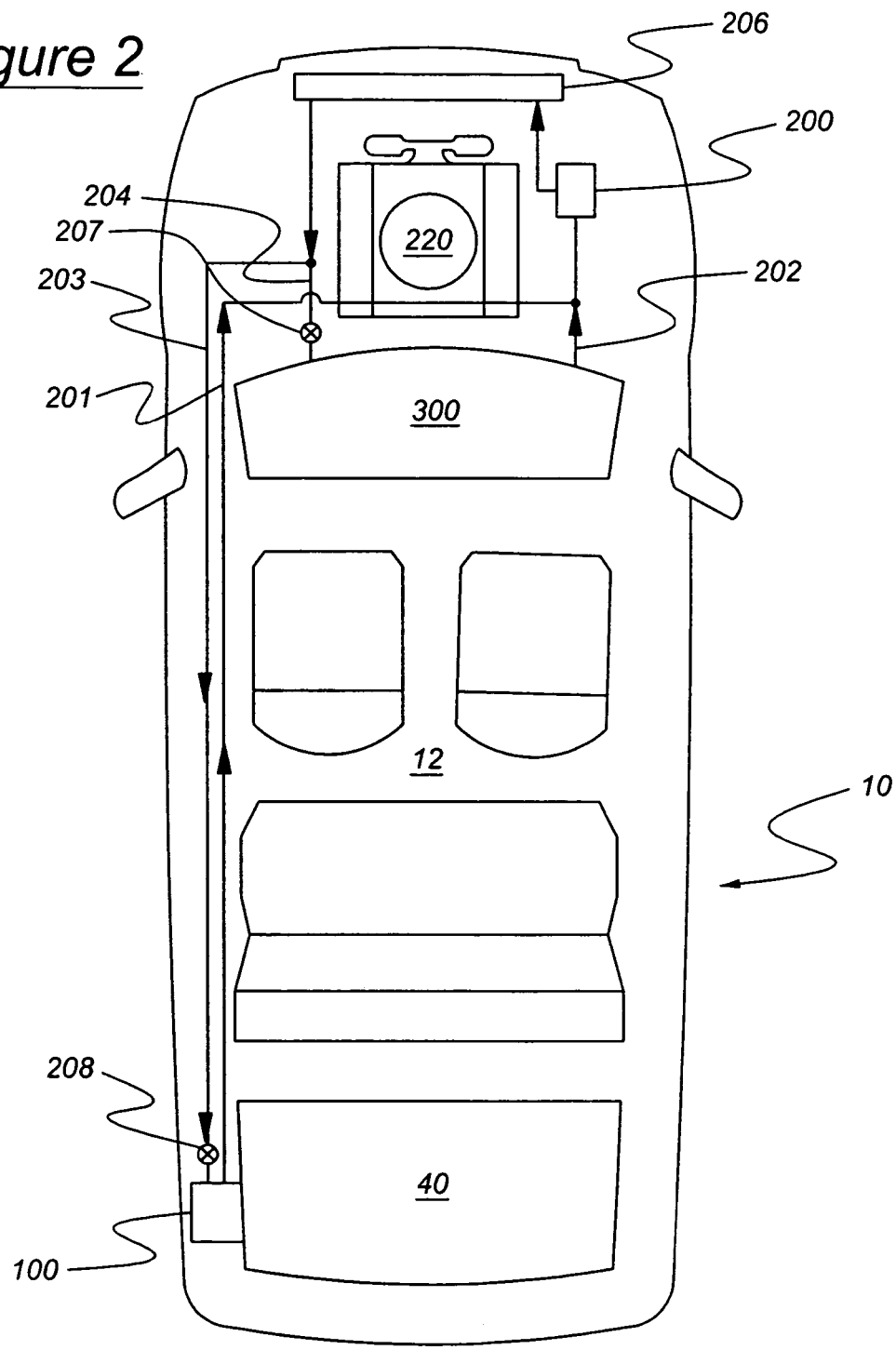
FIG. 2 is a schematic top view of a vehicle containing an embodiment of the present invention.

A schematic top view of the vehicle 10 is shown in FIG. 2 with the defined passenger air space 12 and localized space 40. A compressor 200 and condenser 206 serve to provide refrigerant fluid to both the HVAC system 300 and the grocery chiller unit 100 through controlled shut-off valves 207 and 208, respectively. Compressor 200 is connected to hose 205 to provide high pressure refrigerant fluid to condenser 206. In this case, the compressor is shown to be powered by an internal combustion engine 220. However, the compressor 200 could also be powered by an electric or hydraulic motor. Future technological improvements could, of course, provide alternatives to the compressor or its powering components without interfering with the concepts of this invention.

The HVAC system 300 is employed for maintaining the passenger compartment 12 within a desired temperature range and is supplied with A/C refrigerant fluid through high pressure hose 204 and an electrically controlled shut-off valve 207. Hose 202 is used to return the heated refrigerant fluid to the compressor 200. In this embodiment, the chiller 100 shares compressor 200 and condenser 206 with the HVAC system 300. Accordingly, hoses 201 and 203 are shown connected in parallel to the compressor 200 with hoses 202 and 204 respectively. Hose 203 is routed from condenser 206 to shut-off valve 208 and to the evaporator core 120 to supply refrigerant fluid from the condenser 206. Hose 201 is routed from the evaporator core 106 of the chiller 100 to compressor 200 to return the warmed fluid to the compressor 200.

Figure 3:
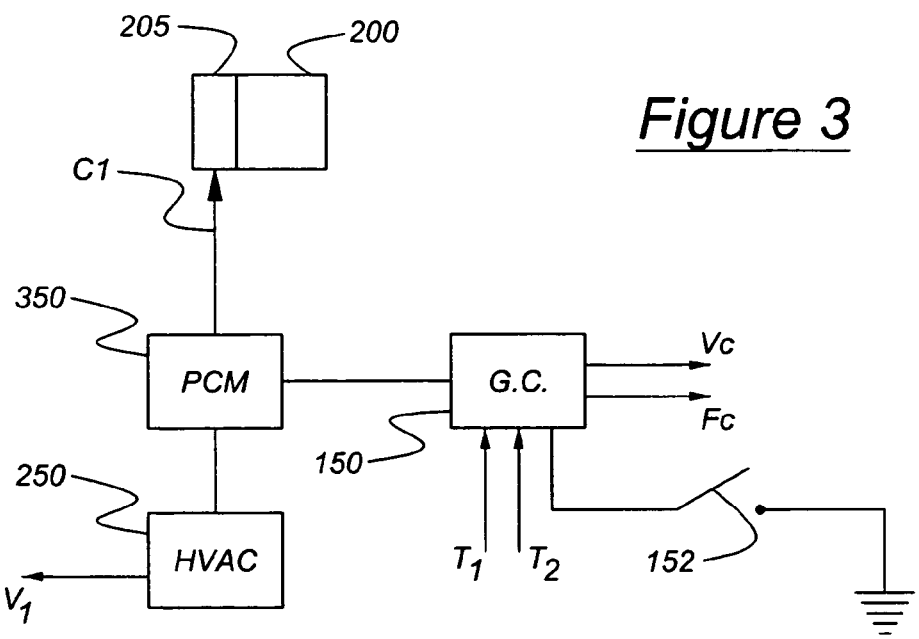
FIG. 3 is a schematic representation of the control system used in the present invention.

HVAC controller 250 is shown in a schematic of FIG. 3 that provides a signal on line V1 to activate and open valve 207. Also, controller 250 sends an engagement signal to the Powertrain Control Module (PCM) 350 to turn on the compressor 200. The PCM is of the type that is commonly used in automotive systems controls the compressor 200 on line C1, when required. The HVAC controller 250 may or may not contain a processor, pending on its level of complexity. The chiller control module 150 provides the necessary cooling functions to the chiller unit 100. However, it is intended to be less complex than the HVAC controller 250 which provides both heated and cooled air (fresh or recirculated) to the passenger compartment on demand. While FIG. 3 indicates that separate control modules are used for HVAC and the chiller control, this showing is for convenience. It is understood that a single control module could be designed to perform both functions, as well as other methods for arranging inputs and control lines.

The chiller control unit 150 receives inputs on its T1 and T2 lines from temperature sensors 124 and 126 located in the chiller air duct 110. When switched on via switch 152 on the vehicle dash (or elsewhere), the controller 150 will send a signal to PCM 350 to engage the clutch 205 of compressor 200 with an output signal on line C1, and open the shut-off valve 208 with an output signal on line Vc. When engaged and powered, the compressor 200 will provide refrigerant fluid to the evaporator core 120 through the open valve 208. The controller 150 also controls the speed of the variable speed fan 130 with an output signal on line Fc. In this embodiment, temperature sensors 124 and 126 provide temperature feedback to chiller control unit 150. At least one temperature sensor is required to allow the controller to determine the settings for the fan speed as well as when to cause the compressor to be engaged and the shut-off valve 208 to be opened, to provide refrigerant fluid to the evaporator 120. However, by using temperature feedback from both the supply and return ducts the controller can more precisely determine the temperature differential between supplied and returned air and make certain conclusions about the operation of the system. For instance, if one duct opening is fully blocked, the controller can sense the failure of the system to cool the localized volume over time and shut down the system to protect the elements.

In the foregoing discussion, it should be clear that the chiller unit 100 is controlled independently from the HVAC system 300. This allows the vehicle occupants to turn the HVAC off and open the windows if so desired, while providing a chilled environment for the contents of the cargo storage area.

Figure 4:
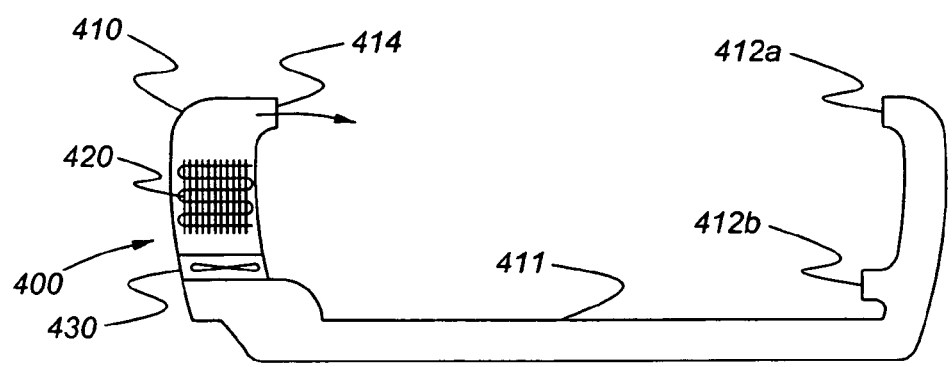
FIG. 4 is a functional view of an alternative embodiment of the present invention.

An alternative embodiment of the invention is shown in FIG. 4, wherein the air duct 410 is extended to provide cross-flow of cooled air through the localized volume. In this case, a duct portion 411 extends, below the floor of the storage area and joins with a duct portion 413 that is located adjacent the opposite wall. Duct portion 413 contains openings 412a and 412b which provide a path for the flow of return air to the system. With an evaporator core 420, fan 430 and supply opening 414 located in duct 410, the system can provide a more even cooling of the localized volume. The fan 430 may be located at any position within the air duct 410 or portions thereof where its function is deemed to be the most efficient.

Figure 5:
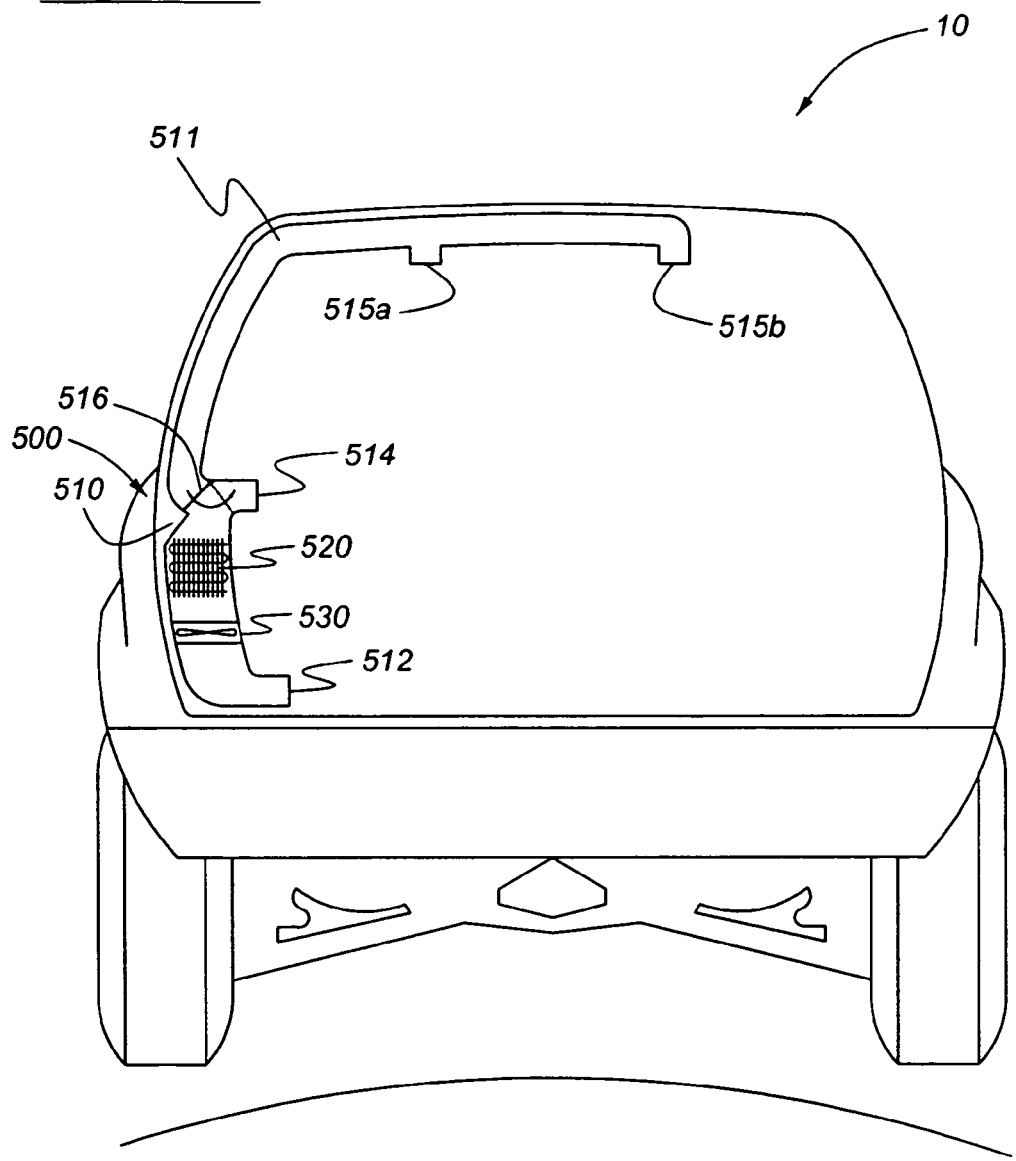
FIG. 5 is a functional view of another alternative embodiment of the present invention.

Another alternative embodiment is shown in FIG. 5, wherein the embodiment shown in FIG. 1 is modified to allow storage compartment cooling from the ceiling of the vehicle when the chiller function is not needed or the need is greatly reduced, such as when pets are located in the localized space. In this case, the chiller unit 500 includes an air duct 510 with a pair of openings 512 and 514 to remove and supply air to the localized volume. An evaporator core 520 is also contained within air duct 510 to refrigerate the air flowing therethrough. A variable speed fan 530 also is included within the air duct 510 to act as an air movement device. The fan 530 forces the air through the duct 510 and the evaporator core 520 as well as providing the supply and removal of cooled air to and from the localized volume. A duct portion 511 extends from the upper portion of duct 510 into the ceiling of the vehicle. Openings 515a and 515b are provided in the duct portion 511 to allow supply of refrigerated air to the larger cabin volume, when desired. A mode selection door 516 is located between the air duct opening 514 and the duct portion 511. The mode selection door 516 may be placed in any selected position to regulate the amount of air that is distributed to the several supply openings. This allows the chiller unit to provide refrigerated air to the storage area, as in the first embodiment and to serve a more flexible function of providing additional cooling to the rear of the passenger compartment.

From the foregoing, it can be seen that there has been brought to the art a new and improved system for providing localized cooling to a predetermined storage volume of a vehicle with great flexibility to satisfy the desires and convenience of the vehicle users. It is to be understood that the preceding descriptions of the preferred embodiment and alternative embodiments are merely illustrative of some of the many specific embodiments that represent applications of the principles of the present invention. Clearly, other arrangements would be evident to those skilled in the art without departing from the scope of the invention as defined by the following claims.

I claim:

1. An apparatus for providing controlled cooling to a defined localized volume within the interior of a vehicle that contains an HVAC system for controlling the interior temperature of the passenger compartment, comprising:
    a localized volume defined within the vehicle separate from the passenger compartment;
    an evaporator core element located adjacent to the localized volume and connected to receive refrigerant fluid from the condenser and compressor of the HVAC system;
    at least one air duct having openings in communication with the localized volume and said evaporator core element to direct the flow of air to and from the localized volume;
    an air movement device that controls the flow of air through the air duct;
    at least one sensor for detecting the temperature of the air flowing through the air duct;
    a control device being connected to said at least one sensor and to said air movement device for regulating the flow of air over said evaporator core element and into said localized volume as necessary to cool and maintain the temperature of said localized volume within a predetermined range of temperatures.

2. An apparatus as in claim 1, wherein said air movement device is located within said air duct.

3. An apparatus as in claim 1, wherein a first sensor is included for detecting the temperature of air entering the air duct from the localized volume and a second sensor is included for detecting the temperature of air leaving the air duct to the localized volume and further wherein said first and second sensors are connected to said control device.

4. An apparatus as in claim 1 wherein said localized volume is defined by insulated walls, floor and a cover to retard the migration of heat from said passenger compartment to said localized volume.

5. An apparatus as in claim 1, further including at least one control valve between said evaporator core and said condenser to control the flow of refrigerant fluid to said evaporator core, wherein said control device is connected to said control valve to regulate the flow of coolant to said evaporator core.

6. An apparatus as in claim 1, wherein said refrigerant fluid is supplied from a condenser and compressor which is shared in common with the HVAC and independently controlled by said apparatus and said HVAC.

7. In a passenger vehicle which contains an HVAC system for controlling the interior temperature of the passenger compartment, an apparatus for providing controlled cooling to the air of a defined localized volume suitable for storing groceries and the like, comprising:
    walls, flooring and cover to define said localized volume and insulation to retard the migration of heat from said passenger compartment to said localized volume;
    an air duct having openings in communication with the localized volume to receive air from said localized volume and to direct the flow of air to said localized volume;
    a heat exchanger located in the flow of air within said air duct and connected to receive refrigerant fluid from the HVAC system;
    an air movement device for creating the flow of air through the air duct;
    at least one sensor for detecting the temperature of the air flowing through the air duct;
    a control device being connected to said at least one sensor and to said air movement device for regulating the flow of air over said heat exchanger and into said localized volume as necessary to cool and maintain the temperature of said localized volume within a predetermined range of temperatures.

8. An apparatus as in claim 7, wherein said air movement device is located within said air duct.

9. An apparatus as in claim 7, wherein a first sensor is included for detecting the temperature of air entering the air duct from the localized volume and a second sensor is included for detecting the temperature of air leaving the air duct to the localized volume.

10. An apparatus as in claim 9, wherein said first and second sensors are connected to said control device.

11. An apparatus as in claim 7, further including at least one control valve between said heat exchanger and the condenser of said HVAC to control the flow of refrigerant fluid to said heat exchanger, wherein said control device is connected to said control valve to regulate the flow of coolant to said heat exchanger.

12. An apparatus as in claim 7, wherein said localized volume is located in the storage area of the vehicle and at least one of the walls is configured to allow access to said localized volume.

13. An apparatus as in claim 7, wherein said localized volume is located in the storage area of the vehicle and said cover is configured to allow access to said localized volume.

14. An apparatus as in claim 7, wherein said air duct is adjacent to said localized volume with openings in one wall of said localized volume to receive air from and to direct the flow of air to said localized volume.

15. An apparatus as in claim 7, wherein said air duct is adjacent to said localized volume with openings in separate walls of said localized volume to receive air from and to direct the flow of air to said localized volume.

16. An apparatus as in claim 7, wherein said air duct is adjacent to said localized volume with openings in one wall and in said floor of said localized volume to receive air from and to direct the flow of air to said localized volume.

17. An apparatus as in claim 7, wherein said air duct is located within said localized volume with openings disposed to circulate air within said localized volume.

18. An apparatus as in claim 7, wherein said refrigerant fluid is provided from a condenser and compressor that are shared in common with said HVAC and independently controlled by said apparatus and said HVAC.

19. A method of providing controlled cooling to a localized volume within the interior of a vehicle which contains an HVAC system for controlling the interior temperature of the passenger compartment, comprising the steps of:

providing insulated walls, flooring and cover to define said localized volume and retard the migration of heat from said passenger compartment to said localized volume;

providing an air duct adjacent to and in communication with the localized volume to receive air from said localized volume and to direct the flow of air to said localized volume;

providing an evaporator core element located in the flow of air within said air duct and connected to receive refrigerant fluid from the condenser of said HVAC systems;

providing an air movement device for creating the flow of air through the air duct;

providing at least one sensor for detecting the temperature of the air flowing through the air duct;

providing a control device being connected to said at least one sensor and to said air movement device for regulating the flow of air over said evaporator core and into said localized volume as necessary to cool and maintain the temperature of said localized volume within a predetermined range of temperatures.

20. A method as in claim 19 wherein said air movement device is provided to be within said air duct.

21. A method as in claim 19, wherein a first sensor is provided for detecting the temperature of air entering the air duct from the localized volume and a second sensor is provided for detecting the temperature of air leaving the air duct to the localized volume.

22. A method as in claim 21, wherein said first and second sensors are connected to said control device.

23. A method as in claim 19, further including the step of providing at least one control valve between said evaporator core and the condenser of said HVAC to control the flow of refrigerant fluid to said evaporator core, wherein said control device is connected to said control valve to regulate the flow of coolant to said evaporator core.

* * * * *